(12) United States Patent
Mende (10) Patent No.: US 11,320,518 B2
(45) Date of Patent: May 3, 2022

(54) METHOD FOR DETECTING ROAD USERS

(71) Applicant: S.M.S. SMART MICROWAVE SENSORS GMBH, Braunschweig (DE)

(72) Inventor: Ralph Mende, Braunschweig (DE)

(73) Assignee: S.M.S. SMART MICROWAVE SENSORS GMBH, Braunschweig (DE)

( * ) Notice: Subject to any disclaimer, the term of this patent is extended or adjusted under 35 U.S.C. 154(b) by 0 days.

(21) Appl. No.: 17/315,484

(22) Filed: May 10, 2021

(65) Prior Publication Data

US 2021/0263134 A1    Aug. 26, 2021

Related U.S. Application Data

(63) Continuation of application No. PCT/EP2020/059287, filed on Apr. 1, 2020.

(30) Foreign Application Priority Data

May 6, 2019 (DE) ..................... 10 2019 111 679.1

(51) Int. Cl.
  *G01S 7/41* (2006.01)
  *G01S 7/02* (2006.01)
  *G01S 13/931* (2020.01)

(52) U.S. Cl.
  CPC .............. *G01S 7/412* (2013.01); *G01S 7/021* (2013.01); *G01S 7/023* (2013.01); *G01S 13/931* (2013.01); *G01S 2013/9322* (2020.01)

(58) Field of Classification Search
  CPC .......... G01S 7/412; G01S 7/021; G01S 7/023; G01S 13/931
  See application file for complete search history.

(56) References Cited

U.S. PATENT DOCUMENTS 5,929,802 A * 7/1999 Russell ................. G01S 7/4026
                                                             342/70
5,959,570 A * 9/1999 Russell ................. G01S 7/4004
                                                             342/70

(Continued)

FOREIGN PATENT DOCUMENTS

DE   10 2009 000 469 A1   8/2010
DE   10 2012 021 212 A1   4/2014

(Continued)

*Primary Examiner* — Peter M Bythrow
(74) *Attorney, Agent, or Firm* — WC&F IP (57) ABSTRACT

The invention relates to a method for detecting road users along at least one traffic route, wherein the method comprises the following steps:
  emitting transmission signals by means of at least one transmission device for radar radiation,
  detecting received signals by means of at least one reception device for radar radiation,
  mixing the transmission signals and the received signals to produce baseband signals and calculating a detection matrix from the baseband signals and evaluating the detection matrix in an evaluation module of an electronic data processing device, wherein peaks of the detection matrix are assigned to objects,
  checking whether a disturbance criterion is met in a diagnostic module,
  generating signals from the results of the evaluation in the evaluation module and the check in the diagnostic module, and
  transmitting the signals to a control module of an electronic data processing device.

20 Claims, 4 Drawing Sheets
(3 of 4 Drawing Sheet(s) Filed in Color)

(56) References Cited

U.S. PATENT DOCUMENTS

| | | | | |
|---|---|---|---|---|
| 6,127,965 A * | 10/2000 | McDade | G01S 13/931 | |
| | | | 342/159 | |
| 2003/0016161 A1 | 1/2003 | Okai et al. | | |
| 2009/0243912 A1 * | 10/2009 | Lohmeier | G01S 13/931 | |
| | | | 342/70 | |
| 2012/0013503 A1 * | 1/2012 | Heilmann | G01S 13/931 | |
| | | | 342/26 R | |
| 2012/0032838 A1 * | 2/2012 | Heilmann | G01S 13/95 | |
| | | | 342/192 | |
| 2012/0050093 A1 * | 3/2012 | Heilmann | G01S 13/931 | |
| | | | 342/173 | |
| 2013/0113653 A1 * | 5/2013 | Kishigami | G01S 7/4021 | |
| | | | 342/189 | |
| 2015/0070207 A1 * | 3/2015 | Millar | G01S 13/4454 | |
| | | | 342/174 | |
| 2015/0177303 A1 * | 6/2015 | Ebling | G01R 29/10 | |
| | | | 342/27 | |
| 2015/0338508 A1 * | 11/2015 | Chabaud | G01S 7/4056 | |
| | | | 342/173 | |
| 2015/0362584 A1 * | 12/2015 | Jenkins | G01S 7/4056 | |
| | | | 342/171 | |
| 2017/0059695 A1 * | 3/2017 | Fetterman | G01S 13/726 | |
| 2017/0269196 A1 * | 9/2017 | Millar | G01S 7/4026 | |
| 2017/0269200 A1 * | 9/2017 | Liu | G01S 13/345 | |
| 2017/0315230 A1 * | 11/2017 | Wang | G01S 13/91 | |
| 2018/0136624 A1 | 5/2018 | Graves et al. | | |
| 2018/0348365 A1 | 12/2018 | Achour et al. | | |
| 2019/0072646 A1 * | 3/2019 | Zelen | G01S 13/66 | |

FOREIGN PATENT DOCUMENTS

| | | |
|---|---|---|
| DE | 10 2013 008 607 A1 | 11/2014 |
| DE | 10 2017 105 783 A1 | 9/2018 |
| EP | 1864155 B1 | 7/2009 |
| EP | 3 173 812 A1 | 5/2017 |
| RU | 2467347 C1 | 11/2012 |

* cited by examiner

METHOD FOR DETECTING ROAD USERS

The invention relates to a method for detecting road users along at least one traffic route.

Nowadays, road users are detected along a wide variety of traffic routes on land, at sea or in the air. The aim is often the statistical evaluation of the quantity and type of road users and/or traffic flow control along at least one traffic route.

The flow of traffic along traffic routes, in particular intersecting traffic routes, such as intersections or junctions, is nowadays often controlled by electronically operating systems that, for example, adjust traffic light circuits, priority regulations and/or speed limits to the traffic conditions. To this end, it is necessary to detect the current traffic situation. In many cases, this is done by radar sensors that emit radar radiation in the form of transmission signals so that the transmission signals are reflected by road users, such as motor vehicles. This reflected radar radiation is detected in the form of received signals. It contains information on the distance, radial velocity, direction of movement and/or size of the road user.

A wide variety of transmission signals are known from the prior art. For example, frequency ramps may be used that are repetitive and identically designed, or that are differently designed and emitted alternately or simultaneously. Corresponding transmission signals are known from DE 10 2013 008 607 A1, for instance, or DE 10 2017 105 783 A1. Signals generated by, preferably digital, PMCW (Phase Modulated Continuous Wave) modulation can also be used as transmission signals. In this case, signals are phase-modulated onto a carrier wave, which can then be used as a transmission signal.

With modern methods, it is possible to distinguish between different types of road user, for example motor vehicles, motorcycles and trucks, but also pedestrians or cyclists, and to control the flow of traffic on the basis of the data stored for different types of road users. This can consist, for example, of switching traffic lights and/or opening or closing additional lanes or introducing or lifting speed limits.

The use of radar sensors, for example, has the advantage over the use of cameras operating in the visible light range that radar sensors operate independently of daylight and also function in fog and darkness. Nevertheless, even when radar sensors are used to monitor and control a traffic flow, disturbances can occur, for example, due to weather effects or interference with other sources of radar radiation. In the event of a disturbance, the detection of road users is not possible, or at least not to the optimum degree. A disturbance can obstruct or even prevent a smooth flow of traffic and also cause hazards, especially for the road users involved.

The invention therefore aims to improve a method for controlling a traffic flow along at least one traffic route in such a way that disturbances in the detection of road users can be recognized in good time, thereby enabling a response to increase road safety.

The invention solves the task by way of a method for detecting road users along at least one traffic route, wherein the method comprises the following steps:
emitting transmission signals by means of at least one transmission device for radar radiation,
detecting received signals by means of at least one reception device for radar radiation,
mixing the transmission signals and the received signals to produce baseband signals and calculating a detection matrix from the baseband signals and evaluating the detection matrix in an evaluation module of an electronic data processing device, wherein peaks of the detection matrix are assigned to objects,
checking whether a disturbance criterion is met in a diagnostic module, generating signals from the results of the evaluation in the evaluation module and the check in the diagnostic module, and
transmitting the signals to a control module of an electronic data processing device.

According to the invention, radar radiation in the form of transmission signals is thus emitted by at least one transmission device for radar radiation, which is preferably part of a radar sensor. Said signals may have different forms, as previously explained. They are reflected to different degrees by different road users in the monitored section of the at least one traffic route, wherein the strength of the reflection depends especially on the size of the road user and its distance from the transmission device and the reception device. A part of the reflected radar radiation is reflected back in the form of received signals to the radar sensor, in particular to a reception device for radar radiation which forms part of a radar sensor. The received signals are detected by means of at least one reception device for radar radiation, which is preferably also part of the at least one radar sensor. The transmission signals, which have been emitted by the at least one transmission device for radar radiation, and the received signals, which have been detected by the at least one reception device for radar radiation, are mixed to produce baseband signals, from which the detection matrix is calculated. A detection matrix is a range-Doppler matrix, for example, which is calculated using a two-fold Fourier transform of the baseband signals. If the emitted transmission signals are not repeating frequency ramps, but preferably digitally phase-modulated signals, the range-Doppler matrix can also be calculated with a correlation (range) and a Fourier transform (Doppler). The method is known from the prior art and familiar to experts. Other possible detection matrices include, for example, range-time matrices, with which only one Fourier transform is conducted, or a range-angle matrix. Preferably, several detection matrices are calculated and used in one, preferably in each measurement cycle, for example in different angular ranges and/or directions.

The detection matrix is then evaluated in an evaluation module of an electronic data processing device. In the detection matrix, spectral energy (signal energy) is assigned to different information. While one axis of, for example, a range-Doppler matrix plots the distance ("range"), the other axis plots the Doppler frequency and therefore information on the radial velocity of the road user reflecting the transmission signals. The presence of signal energy, which is preferably significantly above the noise of the matrix at a spectral position in a cell of the range-Doppler matrix, especially preferably by more than 20 dB, consequently means that the received signals have occurred from a reflection of transmission signals from an object, in particular a road user, which is at a certain distance ("range") and has a certain radial velocity towards or away from the at least one reception device, which results from the corresponding Doppler frequency. However, the assignment between radial velocity and Doppler frequency may be ambiguous; methods for resolving this issue are known from the prior art.

Signal energy at such an element of the detection matrix, especially the range-Doppler matrix, is described as a "peak", the different peaks of the range-Doppler matrix being assigned to different objects, in particular road users.

A single peak or a range of the range-Doppler matrix containing several peaks may be assigned to an object.

According to the invention, a check is conducted in a diagnostic module to determine whether a disturbance criterion is met. On the basis of the results of the evaluation of the detection matrix in the evaluation module and the check in the diagnostic module, signals are generated which are transmitted to the control module. Results of an evaluation of the baseband signals in the time range are preferably also taken into account.

The control module is configured, for example, to statistically evaluate the signals and/or control the traffic flow along the at least one traffic route. The latter case concerns a method for controlling the traffic flow along the at least one traffic route.

Preferably, the evaluation module and/or the diagnostic module are parts of an electronic data processing device, which is part of the radar sensor, which also comprises the transmission device and/or the reception device. The control module is preferably not part of the sensor, but part of a control computer, for example, which is used to control the traffic flow. Of course, the control module may also be part of the sensor. It is also possible that the evaluation module and/or the diagnostic module are not part of the radar sensor, but part of another electronic data processing device, to which the control module preferably also belongs.

In a preferred configuration, in order to check whether a disturbance criterion is met, the evaluated detection matrix, preferably the evaluated range-Doppler matrix, and the baseband signals are used. It is advantageous for a disturbance criterion to be met, for example, when rain and/or snow and/or an interference with signals from other transmission devices and/or a change in the position and/or orientation of the respective sensor is detected during the evaluation of the detection matrix.

Precipitation in the form of rain and/or snow also reflects at least a part of the emitted transmission signals, thereby resulting in a certain type of received signals. This leads to characteristic effects in the evaluated detection matrix. For example, in a range-Doppler matrix, a lot of signal energy will occur at a distance ("range") of a few meters, since most of the reflected transmission signals are reflected from the large number of precipitation elements, i.e. raindrops or snowflakes, in this range. Raindrops and snowflakes at a greater distance also reflect the transmission signals that have penetrated up to that point, but because the distance is then too great, they cannot cause a significant intensity of received signals. The radial velocity of precipitation is also typical, as raindrops among themselves and snowflakes among themselves often fall to the ground with a characteristic velocity. Depending on wind conditions, of course, the radial velocity toward or away from the at least one radar sensor may be affected. In this way, rain and/or snow can be easily and reliably detected.

If this is the case, a disturbance criterion is deemed to be met, as it is no longer possible, or at least no longer reliably possible, for the sensor to detect road users reliably and unambiguously and, if necessary, to assign them to different classes.

Preferably, a plurality of detection matrices, preferably range-Doppler matrices of different, preferably successive measurement cycles are evaluated. They are formed of baseband signals mixed from transmission signals and received signals of different measurement cycles. This makes it possible to relate the objects detected during the evaluation of the plurality of the detection matrices to each other and thus to track a movement of the objects. This makes it easier to distinguish between moving objects, especially road users, and static targets, such as buildings, signs or traffic lights, than is possible by evaluating the radial velocity. Moving objects can thus be assigned an actual trajectory, which in particular contains the position of the respective object at different points in time. It is advantageous if a disturbance criterion is deemed to be met when a predetermined number, for example at least 10, at least 25 or at least 50 of these actual trajectories do not follow a course stored in an electronic database. Preferably, this predetermined number of actual trajectories that do not follow the stored course must occur in a predetermined period, for example within 10 minutes, within 5 minutes or within 2 minutes, for the disturbance criterion to be met.

In principle, the monitored area of the at least one traffic route, in which road users may be present who can reflect the emitted transmission signals in the direction of the at least one receiving device, is known. For example, it comprises several traffic lanes in which certain driving directions dominate and which follow a predetermined course. This course can be stored in an electronic database. The emission of the transmission signals, the receiving of the received signals, the mixing of the signals to form baseband signals and the determination of a detection matrix, preferably a range-Doppler matrix, as well as its evaluation are usually carried out not only once, but several times consecutively, as previously described. These steps in the method may be carried out several hundred times per second, for example. It is therefore possible to track individual objects over a longer period of time. In the process, the velocity vector and/or the location at which the respective object is detected may change. This allows an actual trajectory of the object, and thus the road user, to be determined.

This determined actual trajectory is preferably compared with the trajectories that are stored, for example, for different lanes of the at least one traffic route. If the actual trajectory calculated from the different detection matrices deviates, for example in an azimuth angle or an elevation angle, from the target trajectory stored in the electronic database, this is a clear indication that the orientation and/or the position of the at least one radar sensor, but at least the position and/or orientation of the at least one reception device for radar radiation has been displaced. The monitored area of the traffic route has thus changed, so that reliable data can no longer be determined, or at least this cannot be guaranteed. In this case, a disturbance criterion is preferably met.

It is advantageous if a maximum, a minimum, an average signal-to-noise ratio and/or the median of the signal-to-noise ratio is detected from the signal-to-noise ratios of selected peaks of the detection matrix. A disturbance criterion is then met when the maximum, the minimum, the average signal-to-noise ratio and/or the median of the signal-to-noise ratio is lower than a predetermined limit. This predetermined limit is, for example, 100 dB, preferably 50 dB, especially preferably 20 dB. The respective signal-to-noise ratio is consequently detected via the selected peaks of the detection matrix, for example the range-Doppler matrix. Subsequently, the maximum, the minimum, the average and/or the median of these ratios are detected and compared with the predetermined limit. If the respective signal-to-noise ratio is smaller than the predetermined limit, it is assumed that a reliable object recognition of the individual road users is not guaranteed, or is not reliably guaranteed, meaning that a disturbance criterion is met.

The selected peaks of the detection matrix are preferably all peaks that could be assigned to an object or several moving objects. It is particularly preferable if it refers to all peaks that could be assigned to a moving object. Alternatively, the selected peaks are all peaks of the detection matrix used.

Preferably, a radar cross-section of the objects, preferably the moving objects, is detected during evaluation of the detection matrix, for example the range-Doppler matrix. This can be detected from, for example, the intensity of the received signals and the intensity of the emitted transmission signals, wherein the distance detected from the detection matrix and/or one or several angles of the respective object are preferably also taken into account. With this design of the method, a disturbance criterion is met when a maximum, a minimum and/or an average radar cross-section and/or the median of the detected radar cross-sections is smaller than a predetermined limit. Typical values for a radar cross-section are, for example, 1 $m^2$ for a human, approximately 10 $m^2$ for a passenger vehicle and approximately 100 $m^2$ for a truck. Depending on the monitored cross-section, the predetermined limit for the average radar cross-section is selected. If the respective limit is exceeded, a disturbance criterion is met in this design of the method.

Preferably, the radar cross-section of all objects, especially preferably all moving objects, is determined. Alternatively or additionally, the radar cross-sections of a certain class of objects, for instance all passenger vehicles and/or all trucks, can be determined and used for evaluation. In this case, different limits for the radar cross-sections of objects of different classes can be used.

In a preferred design of the method, the at least one reception device features several, preferably at least three, especially preferably at least four, especially preferably at least eight, reception antennae. Received signals reflected from an object reach this plurality of reception antennae at different points in time. The received signals of the various reception antennae are mixed with the emitted transmission signals and detection matrices, for example range-Doppler matrices, formed from the resulting baseband signals. Due to the different points in time at which the received signals reach the various reception antennae, there is a phase displacement between the different received signals and thus different baseband signals for the different detection matrices. The Fourier transforms conducted during the calculation of the detection matrix, in particular the range-Doppler matrix, result in complex-valued entries that feature a complex phase. The phase difference of these phases between two reception antennae depends only on their distance. Reception antennae pairs with the same distance also have the same phase difference.

Preferably, a measure of the dispersion of these phase differences, for example the standard deviation of these phase differences, is determined. A disturbance criterion is met when the largest, the smallest and/or an average standard deviation and/or the median of the detected standard deviations exceeds a predetermined limit of, for example, 60°, preferably 30°, especially preferably 5°.

The standard deviation is preferably calculated for all peaks of the detection matrix, particularly preferably for the peaks that could be assigned to an object. In an especially preferred design, the standard deviation of the phase difference is calculated for all peaks of the detection matrix that could be assigned to moving objects. The calculation is preferably performed in the direction of the azimuthal angle and/or in the direction of the elevation angle. The azimuthal angle extends in a plane perpendicular to the direction of gravity. The elevation angle, however, describes an angle relative to the direction of gravity.

Preferably, the number of objects is determined to which at least one peak of the detection matrix has been assigned. Preferably, the number of static objects is determined. In this case, a disturbance criterion is deemed to be met when the number exceeds a predetermined upper limit of, for example 150, preferably 100, especially preferably 75, or when the number is below a predetermined lower limit of preferably 10, preferably 20, especially preferably 30. If the number of objects detected to which at least one peak of the detection matrix could be assigned is greater than this predetermined upper limit or smaller than the predetermined lower limit, it is assumed that this is either a very unusual traffic situation for which no optimal control signals are available for controlling the traffic flow, or that the sensor that emits the radar beams and receives the received signals is malfunctioning. Of course, these limits are to be selected depending on the traffic route whose traffic flow is being controlled. For a rural road that may be lightly travelled, the predetermined upper limit may be smaller, such as 50, 40, or 30, while for a large intersection of multiple traffic routes, such as multiple multi-lane roads, a larger upper limit of, for example, 200, 250, or 300 may be appropriate. Likewise, for a rural road that may have little traffic, the predetermined lower limit can be small, for example 5 or even 0. For a large intersection of multiple traffic routes, a predetermined lower limit of 40, 50, or 60 may also be appropriate and selected.

If only or also static objects are counted, the respective limit can be selected on the basis of the number of objects actually present, for example signs or buildings.

It is advantageous if the baseband signal is examined for features characteristic of interference before the detection matrix, for example the range Doppler matrix, is calculated. Preferably, to detect these characteristic features, it is checked whether the signal energy and/or the signal amplitude exceeds a predetermined or adaptively variable limit. If an adaptively selected limit value is used, it is preferably adapted to the prevailing traffic situation, for example by deriving an average signal energy or amplitude, for which a mean value calculation or a median calculation can be used, from the history and determining the limit, for example by multiplying this value by 8, 10 or 12. It is advantageous if a measure for determining the interference intensity and/or the frequency band occupied by the interferer can be derived from an optional subsequent analysis of the limits exceeded, for example with regard to position, width and/or change over time. However, it is also possible to determine the interference intensity, for example, by observing an increased noise level after a first stage Fourier transform or correlation or in the detection matrix. A sufficiently high interference intensity then represents a disturbance criterion.

It is advantageous if disturbance criterion in the form of a collective disturbance criterion is met if a weighted sum of the maximum, the minimum, the average signal-to-noise ratio and/or the median of the signal-to-noise ratio, the maximum, the minimum and/or the average radar cross section and/or the median of the calculated radar cross sections, the minimum, the maximum and/or the average standard deviation and/or the median of the calculated standard deviations and/or the number of objects and/or the interference intensity exceeds a predetermined limit. This limit is almost freely selectable and can be displaced by suitable weightings of the individual summands. This predetermined limit is, for example, −15, 10 or 100. To simplify the calculations, individual or all summands of this weighted sum can be set to limits or scaled separately should they exceed or fall below them.

For example, the maximum signal-to-noise ratio can be raised to 5 dB, 10 dB, or 20 dB, or any other appropriate value should it fall below this. The maximum signal-to-noise ratio can also be set to 40 dB, 50 dB or 60 dB should it exceed this value respectively. The signal-to-noise ratio can also preferably be limited to a range, for example, 14 dB to 50 dB. If the linear ratio is used, the ratio can be limited to 5 to 300. If this size is scaled separately, the area limited in this way is scaled to the scaling range from 0 to 100. Of course, other ranges and scaling ranges may be used.

In this way, calculations are simplified and errors due to excessively large or small values are less likely.

For example, the value for the minimum standard deviation can be set to 0 rad, 0.1 rad, or 0.2 rad, or it can be limited to a maximum of 0.75 rad, 0.5 rad, or 0.4 rad. Such a range can also be scaled to a scaling range from 0 to 100 for the weighted sum.

The number of possible objects can also be set to a value, for example at most 60 and at least 0, wherein this range can also be scaled to a scaling range, for example 0 to 100. It is advantageous if the size is set to the respective predetermined limit should it exceed or fall below it.

Within the weighted sum, the signs of the respective weightings may vary. For example, the minimum standard deviation is given a positive factor, while the number of targets and the maximum signal-to-noise ratio are given a negative factor. As an alternative, the factors can of course also have the opposite signs.

Regardless of whether the individual variables from the disturbance criterion individually or in a weighted sum, they are preferably filtered over time, so that results originating from the evaluation of individual detection matrices or individual measurement cycles do not immediately lead to a disturbance message or allow a disturbance criterion to be considered met. This can be done, for example, by a possibly weighted moving average over time, i.e. the results of several preferably successive measurement cycles.

In a preferred embodiment, the at least one transmission device for radar radiation and the at least one reception device for radar radiation are each part of a radar sensor, wherein the position and/or the orientation and/or the velocity and/or the acceleration of the radar sensor is preferably determined by at least one additional (on-board) sensor. In order to obtain reliable measurement values, it is necessary that the at least one radar sensor maintains the position in which it was configured and preferably also the orientation in which it was configured. If this position changes, for example because a pole or sign to which the sensor has been attached is involved in a traffic accident and has fallen over, for example, it is no longer ensured that the sensor monitors the desired area of the at least one traffic route. This can be detected by a position sensor and/or an orientation sensor. Radar sensors are often placed above and/or beside the roadway, for example on poles, signs or traffic lights. Traffic lights, in particular, are often also suspended above the intersection so that they can be vibrated by the wind. Therefore, it may be advantageous to use a velocity sensor and/or an acceleration sensor to determine the velocity and/or the acceleration of the radar sensor and to consider a disturbance criterion as met if predetermined limits are exceeded. It is advantageous if position, orientation, velocity and/or acceleration sensors are provided for at least two, preferably all three independent spatial directions.

Preferably, a disturbance criterion is met when the position and/or orientation and/or velocity and/or acceleration of the radar sensor deviates from a target value by more than a predetermined limit.

The control signals transmitted to the control module of the electronic data processing device are preferably numbers, positions, velocity vectors, dimensions (spatial expansion) and/or classifications of road users (objects) which could be detected and determined from the peaks of the detection matrix, for example a range-Doppler matrix, or a preliminary stage with information about distance, angle, radial velocity and/or further properties. The disturbance signals to be transmitted, if any, may contain, for example, information that the at least one radar sensor is not working or is not working reliably. In this case, the control module of the electronic data processing device, which is responsible for the control of the traffic flow, resorts to another, possibly time-controlled, model of traffic management and control of the traffic flow. Alternatively, however, the control signals can also contain, for example, the information that all lanes of the at least one traffic route to be monitored are occupied. In this case, it is advantageous if the number of road users and the data concerning these road users transmitted to the control module is overestimated, i.e. more road users are reported than are actually present. Therefore, in the event that a disturbance criterion is considered to be met, the largest possible number of road users in the largest possible number of lanes and directions will be reported.

The signals generated from the results of the evaluation in the evaluation module and the check in the diagnostic module, and then transmitted to the control module, preferably contain evaluation signals that contain information about the objects determined during the evaluation of the range-Doppler matrix when no disturbance criterion is met. The signals preferably consist of the evaluation signals when no disturbance criterion is met. The evaluation signals contain, for example, the list of all peaks when evaluating the range-Doppler matrix, which contains, for example, the radial velocity and the distance from the radar sensor and, if necessary, other properties of the respective object or several objects. The evaluation signals may also include occupancy signals for virtual induction loops by which a control module of a control computer, used for example to control the switching of a traffic light system at an intersection, is told whether a particular lane is occupied. Trigger signals that warn of a fast-approaching road user, for example, can also be included in the evaluation signals.

Preferably, the signals contain a diagnostic signal in addition to the evaluation signals, which contains the information that no disturbance criterion is met.

The signals preferably contain the diagnostic signal, which contains the information that a disturbance criterion is met when a disturbance criterion is met. This diagnostic signal can only consist of this information. Alternatively, the diagnostic signal contains information on the cause of the disturbance. This is especially possible when different disturbance criteria are present, of which only one or a few are met. In this way, different causes of disturbance, for example rain, snow, storm or a displacement of the sensor can be distinguished. The diagnostic signal may also contain parts of the disturbance. For example, the radar sensor's visibility may be limited by rain, so reliable data can still be generated and transmitted to the control module, but it is only reliable for a limited distance from the radar sensor. For example, the diagnostic signal may contain information that the radar sensor's visibility is limited by rain or snow to a certain percentage, such as 75%, 50%, or 25%.

Preferably, the signals include evaluation signals about fictitious targets when a disturbance criterion is met. For example, the evaluation signal can contain the information that all lanes are occupied, although this cannot be inferred from the evaluation of the range-Doppler matrix due to a disturbance. This is particularly advantageous if the control module is part of a control computer that is able to control, for example, the traffic management or the traffic flow on the at least one traffic route exclusively with corresponding evaluation signals. Old control computers in particular are not designed to receive diagnostic signals in addition to these evaluation signals in order to be informed of a malfunction of the radar sensor.

Preferably, the method uses multiple radar sensors, such as four radar sensors. These are preferably located at an intersection where at least two traffic routes meet or cross. The four sensors monitor, for example, different parts of a traffic route or different traffic routes. The transmission signals and reception signals of all radar sensors are processed and evaluated to form range-Doppler matrices. The evaluation signals are transmitted to an intersection computer that contains the control module. If necessary, the diagnostic module is also part of the intersection computer. However, this is not essential, as the diagnostic module can also be arranged in one or every radar sensor.

In especially preferred designs, multiple sensors are used in the method. As a result, different parts of a traffic route and/or different traffic routes can be monitored and road users on said routes detected. In this case, transmission signals are preferably emitted from each sensor and received signals received by each sensor. In this case, the control module is preferably part of the control computer. Preferably, this also applies for the diagnostic module, which preferably evaluates the detection matrices that are generated and provided by all sensors and the respective signals.

A list of all objects to which at least one peak of the detection matrix could be assigned is preferably generated in an evaluation module. Additionally or alternatively, occupancy signals for virtual induction loops or other trigger signals are generated that are necessary or at least helpful for controlling a flow of traffic. This includes signals which contain information about rapidly approaching objects and the like.

The diagnostic module preferably generates a diagnostic signal which can contain, for example, the information that one or all sensors in use have been disturbed. In addition, a degree of the disturbance and/or a cause for the disturbance may be given. For example, this information can indicate that the sensor has been 35% disturbed by a first cause of disturbance, such as rain.

The invention also solves the task by way of a sensor for detecting road users along at least one traffic route, the sensor being configured to conduct a method according to one of the examples of an embodiment described here. The sensor preferably comprises an electronic data processing device with an evaluation module and preferably a diagnostic module.

The patent or application file contains at least one drawing executed in color. Copies of this patent or patent application publication with color drawings will be provided by the Office upon request and payment of the necessary fee.

In the following, an example of an embodiment of the present invention will be explained in more detail by way of the attached figures: They show.

Figure 1:
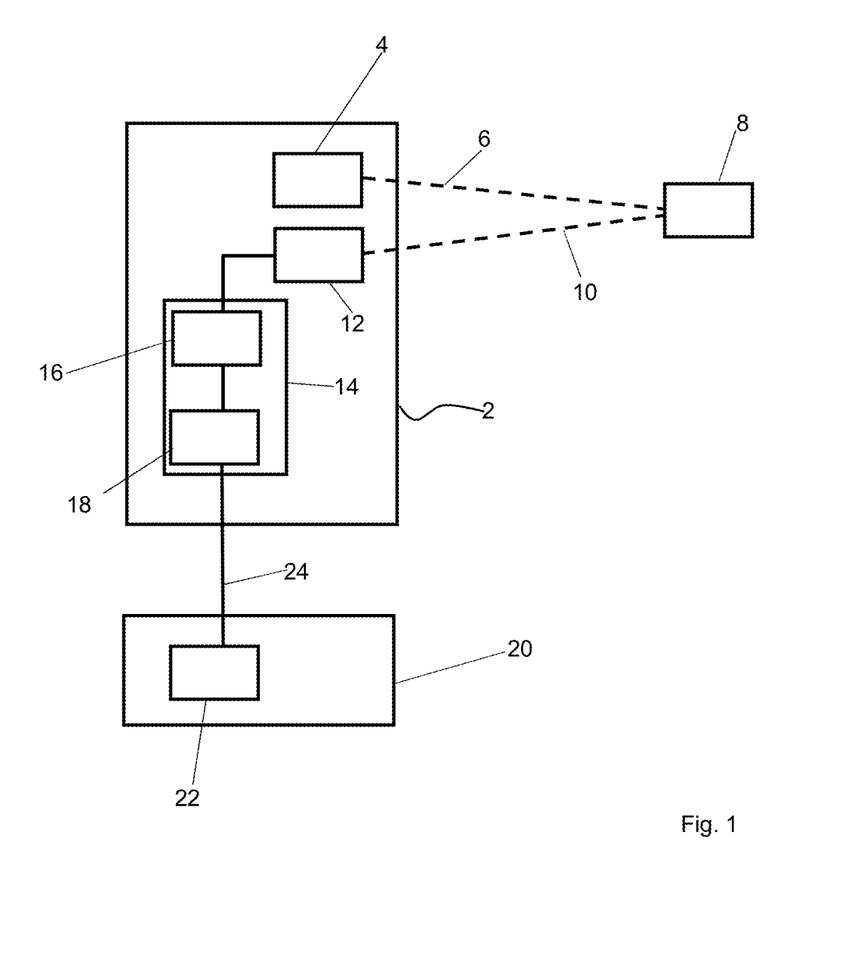
FIG. 1—the schematic representation of a device according to an example of an embodiment of the present invention, FIG. 2—the schematic evaluation according to the distance of objects, FIG. 3—the schematic evaluation according to the radial velocity and reflectivity of objects, and FIG. 4 the schematic representation of the testing of a disturbance criterion.

FIG. 1 schematically depicts a radar sensor 2 that has a transmission device 4. The transmission device 4 is configured to emit transmission signals 6. In FIG. 1, they are reflected by a road user 8 and reflected towards the radar sensor 2 in the form of received signals 10. The road user 8 can be, for example, a pedestrian, a cyclist, a passenger vehicle, a truck or another road user.

The radar sensor 2 comprises a reception device 12 which is configured to detect the received signals 10. In the example of an embodiment shown in FIG. 1, the radar sensor also has an electronic data processing device 14. This device comprises an evaluation module 16 and a diagnostic module 18. It is advantageous, but not absolutely essential, for the evaluation module 16 and the diagnostic module 18 to be part of the same electronic data processing device 14 or for the electronic data processing device 14 to be part of the radar sensor 2.

From the reception device 12, the received signals 10 are fed to the evaluation module 16, where the detection matrix is calculated and evaluated. The diagnostic module 18 checks whether a disturbance criterion is met. The results of the evaluation in the evaluation module 16 and the check in the diagnostic module 18 are then used to generate signals that are transmitted to another electronic data processing device 20. This device comprises a control module 22 to which the signals are transmitted along a data connection 24. The control module 22 of the electronic data processing device 20 is configured, for example, to control the flow of traffic along a traffic route by, for example, switching a traffic light system, traffic signs or taking other steps that influence the flow of traffic.

In a preferred design, the electronic data processing device 20 is also part of the radar sensor 2. It is especially preferable if the electronic data processing device 14 and the electronic data processing device 20 are one and the same data processing device, so that the evaluation module 16, the diagnostic module 18 and the control module 22 are part of a single data processing device.

Figure 2:
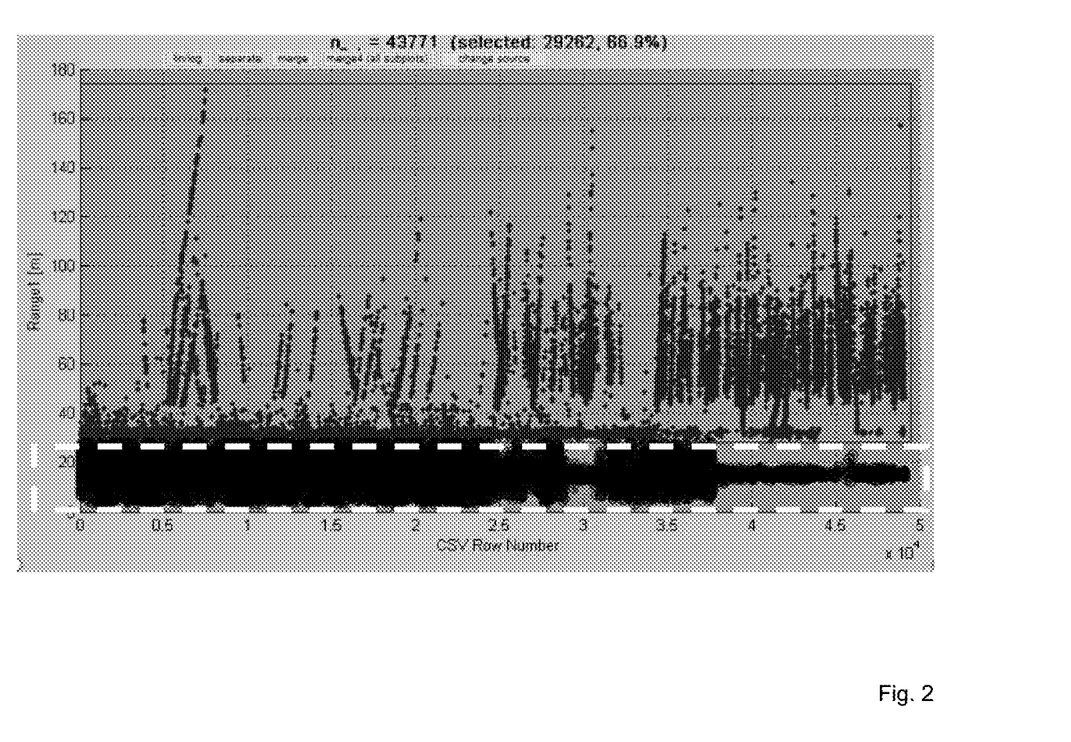

FIG. 2 shows a result of the evaluation of a detection matrix, wherein the distance (range) is plotted for different measurement cycles. In the range of small distances from the sensor up to 25 m, a large number of detected objects can be recognized, which are displayed in black for better clarity. The dashed white frame marks these objects. Consequently, from the evaluation via the distance, it can be determined that in the example of the embodiment shown, a large number of objects are present at a very small distance from the actual sensor.

Figure 3:
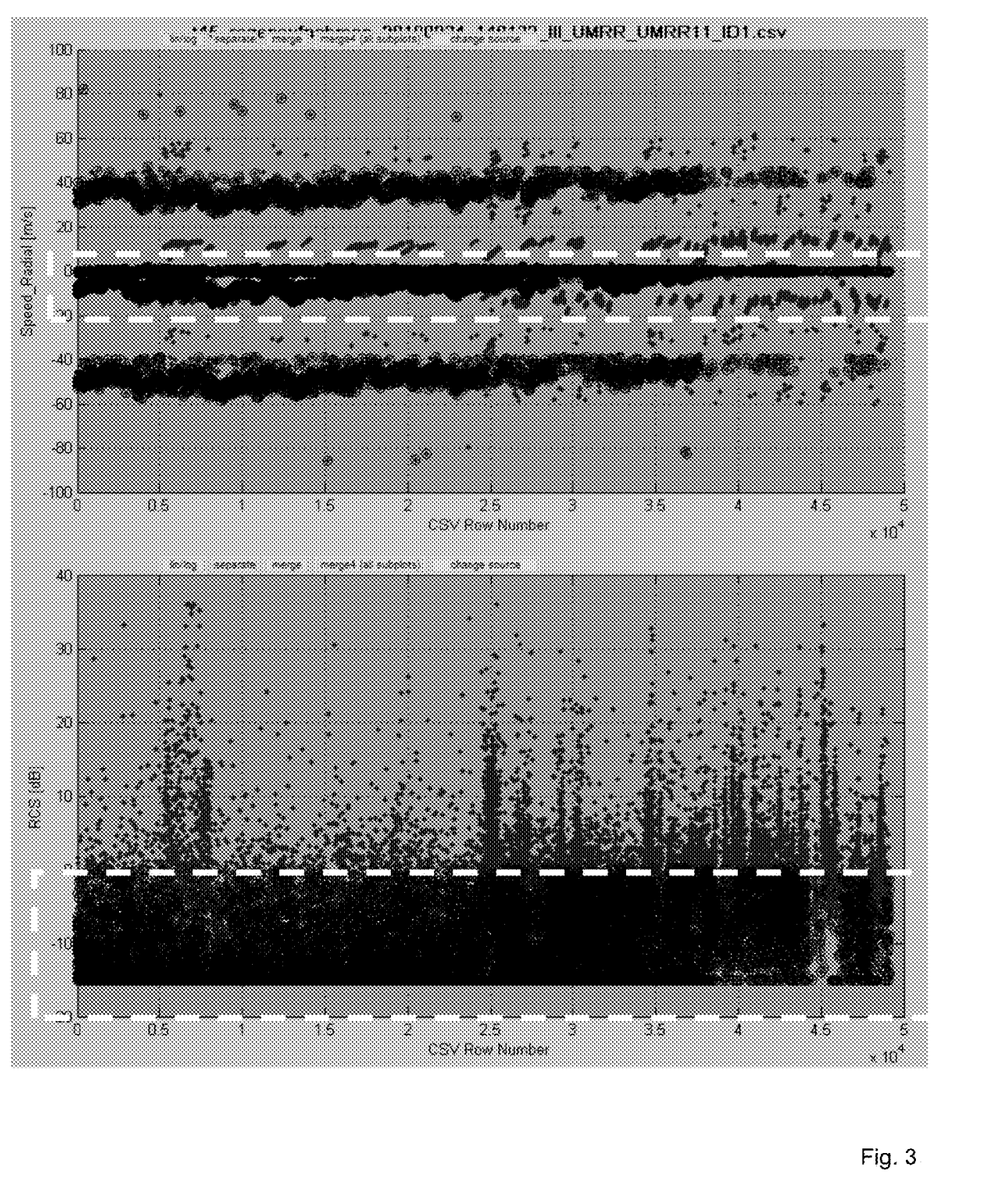

FIG. 3 depicts another evaluation or another part of the evaluation of the detection matrix. The radial velocity, i.e. the velocity of the objects towards or away from the sensor, is shown in the upper area. Again, a large number of objects are found in the low velocity range. The relevant velocity range of objects with radial velocities of, for example, less than 10 m/s is again highlighted by a dashed frame shown in white.

In the lower section of FIG. 3, the reflectivity, which is a direct measure of the radar cross-section of an object, is plotted for a variety of different measurement cycles. Here, too, an accumulation of objects can be seen in an area where the radar cross section is smaller than 0 dBm$^2$. Consequently, the results of the three representations in FIGS. 2 and 3 allow a large number of objects to be identified that have a very small radar cross section, are located at a short distance from the sensor and have a low radial velocity. In the example of an embodiment shown, the objects can be identified as rain.

Figure 4:
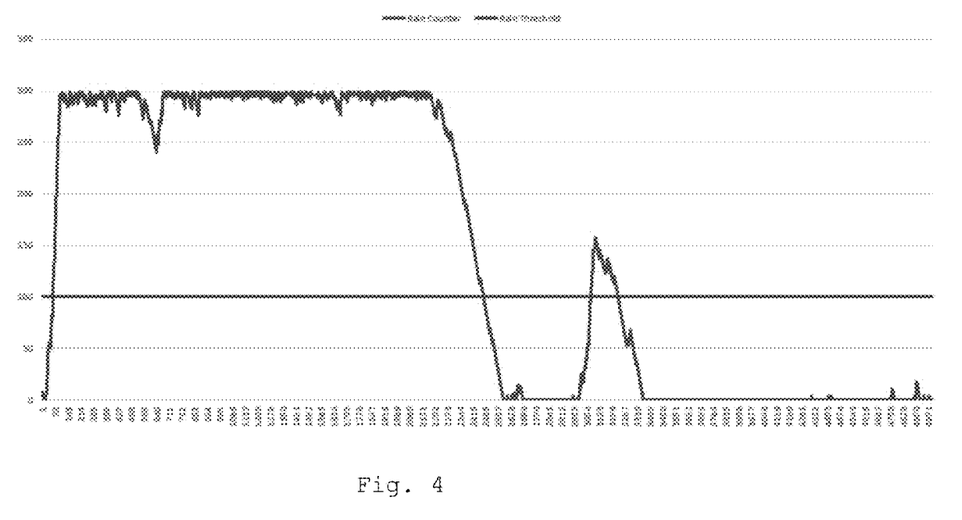

However, for the sensor to function properly, it is crucial that the rain has a certain strength. This can be detected by counting the individual "rain objects" that can be taken from the evaluations of FIGS. 2 and 3. If the number of rain objects detected in this way exceeds a predetermined limit, the rain must be assumed to be so heavy that the sensor's ability to function is impaired. This can be seen in FIG. 4. The limit set in the example of an embodiment shown is 100 objects. If more objects are detected, the line shown in blue is above the set limit and the functionality of the sensor must be assumed to be limited. In the example of the embodiment shown, this is the case up to measuring cycle 2450, for example. If the counted number of rain objects is below the limit, the functionality of the sensor is not limited, so that no disturbance criterion is met. In the embodiment shown in FIG. 4, a disturbance criterion is met between measurement cycles 72 and 2450 and between 3054 and 3267, but is not met in between and thereafter.

REFERENCE LIST

2 radar sensor
4 transmission device
6 transmission signals
8 road user
10 received signals
12 reception device
14 electronic data processing device
16 evaluation module
18 diagnostic module
20 electronic data processing device
22 control module
24 data connection

The invention claimed is:

1. A method for detecting road users along at least one traffic route, and for diagnostics of disturbance, and reporting the detecting and the diagnostics of disturbance to a traffic controller for at least one traffic route, comprising:
   emitting transmission signals by a transmission device of a radar sensor, and detecting received signals by at least one reception device of the radar sensor, the radar sensor being maintained in a configured position and in a configured orientation near the at least one traffic route, by attachment to a pole, a sign, or a traffic light that is near the at least one traffic route, and the emitting being toward the at least one traffic route;
   mixing the transmission signals and the received signals to produce baseband signals;
   calculating a detection matrix from the baseband signals;
   evaluating the detection matrix, in an evaluation module of an electronic data processing device, the evaluating including:
      detecting road users on the at least one traffic route, using peaks of the detection matrix, and assigning a respective at least one of the peaks to detected road users, and
      determining, using the peaks that are assigned, respective ranges of the detected road users;
   generating, by the evaluation module, an evaluation signal that includes information indicating the respective ranges of the detected road users;
   checking, by a diagnostic module of the electronic data processing device, whether a disturbance criterion is met, the disturbance criterion being an indication in the detection matrix of rain, or snow, or both and, responsive to the disturbance criterion being met, generating a diagnostic signal; and
   transmitting the evaluation signal and the diagnostic signal to the traffic controller.

2. The method of claim 1, further comprising:
   calculating the detection matrix as a range-Doppler detection matrix;
   determining the respective ranges of the road users using range entries of the range-Doppler detection matrix; and
   evaluating the range-Doppler matrix further includes determining respective radial velocities of the road users, using Doppler entries of the range-Doppler detection matrix.

3. The method of claim 2, wherein the checking is configured to detect, from the range-Doppler detection matrix, radial velocities having a characteristic radial velocity of rain, or snow, or both and, in response, to determine the disturbance criterion is met.

4. The method of claim 2 wherein the checking includes detecting, from the range information of cells in the range-Doppler detection matrix, there being substantial quantities of received signal energy from reflections within a few meters of the radar sensor, using said detecting to determine rain, snow, or both and, in response to determine the disturbance criterion is met.

5. A method for detecting road users along at least one traffic route, with diagnostics of disturbance, and for reporting the detecting and the diagnostics of disturbance to a traffic controller for the at least one traffic route, comprising:
   performing a plurality of measurement cycles, spaced in time from one another, by a radar sensor maintained in a configured position and in a configured orientation near the at least one traffic route, by attachment to a pole, a sign, or a traffic light near the at least one traffic route, each measurement cycle generating a detection matrix, to form a plurality of detection matrices, using a transmission device of the radar sensor, and at least one reception device of the radar sensor, each measurement cycle including:
      emitting transmission signals by the transmission device, toward the at least one traffic route,
      detecting received signals by the at least one reception device,
      mixing the transmission signals and the received signals to produce baseband signals,
      calculating the detection matrix from the baseband signals,
      evaluating the detection matrix, in an evaluation module of an electronic data processing device, the evaluating including:
         detecting road users on the at least one traffic route, using peaks of the detection matrix, and assigning a respective at least one of the peaks to detected road users, and
         determining, corresponding to the detection matrix, using the respective peaks of the detection matrix that are assigned, respective positions for the detected road users;
   generating, by the evaluation module, an evaluation signal that indicates the respective positions of the detected road users;
   determining, by the evaluation module, actual trajectories of the detected road users, using positions of the detected road users determined at different points in time, using the respective detection matrices calculated by measurement cycles corresponding to the different points in time;

determining, by the evaluation module, using a comparing of the actual trajectories against a database of trajectories, a number of the actual trajectories that do not follow the database of trajectories;

checking, by a diagnostic module of the electronic data processing device, whether a disturbance criterion is met, wherein the disturbance criterion is based at least in part on the number of actual trajectories that do not follow the database of trajectories being at least a predetermined number and, when the disturbance criterion is met, generating a diagnostic signal; and transmitting the evaluation signal and the diagnostic signal to the traffic controller.

6. The method of claim 5, wherein the evaluating further includes:

detecting a plurality of objects, using peaks of one or more of the respective detection matrices calculated by the measurement cycles;

determining, for each of a plurality of the measurement cycles, positions of the objects, the measurement cycles being at respectively different points in time;

tracking of respective movements of the objects, using a relation of positions of the objects over the plurality of the measurement cycles; and distinguishing the road users from among the objects, using the tracking of respective movements of the objects.

7. The method of claim 6, wherein:

the method further comprises storing target trajectories for different lanes of the at least one traffic route;

the evaluating further includes comparing the actual trajectories to the target trajectories for different lanes of the at least one traffic route;

the checking further includes determining whether the radar sensor is displaced from the configured orientation, or from the configured position, or from both, and in response, determining another disturbance criterion is met and generating the disturbance signal to indicate the another disturbance is another criterion met, wherein determining whether the radar sensor is displaced from the configured orientation, or from the configured position, or from both, includes determining, using a result of the comparing the actual trajectories to the target trajectories for different lanes of the at least one traffic route, whether the actual trajectories deviate, in an azimuth angle, or in an elevational angle, from the target trajectories, and determining that the radar sensor is displaced from the configured orientation, or from the configured position, or from both, based on the result of the comparing indicating the actual trajectories for different lanes of the at least one traffic route deviate, in an azimuth angle, or in an elevational angle, from the target trajectories.

8. The method of claim 6, wherein the disturbance criterion is further based at least in part on a number of the actual trajectories that do not follow the database of trajectories continuing to exceed the predetermined number for a time duration that exceeds a time threshold.

9. The method of claim 8, wherein the predetermined number is at least integer 10 and the time threshold is at least 2 minutes.

10. A method for detecting road users along at least one traffic route, with diagnostics of disturbance, and for reporting the detecting and the diagnostics of disturbance to a traffic controller for at least one traffic route, comprising:

performing a measurement cycle, by a radar sensor maintained in a configured position and in a configured orientation near the at least one traffic route, by attachment to a pole, a sign, or a traffic light that is near the at least one traffic route, the radar sensor including a plurality of receiving antennae, the plurality of receiving antennae comprising more than three receiving antennae, the measurement cycle comprising:

emitting transmission signals by a transmission device of the radar sensor, the emitting being toward the at least one traffic route, detecting, by at least one reception device of the radar sensor, a plurality of received signals, each from a different receiving antenna among the plurality of receiving antennae, mixing the transmission signals and the detected plurality of received signals, producing a plurality of baseband signals, each of the baseband signals corresponding to the received signal from a corresponding one of the receiving antennae, calculating, by an evaluation module of an electronic processing device, a detection matrix for each of the baseband signals, producing a plurality of detection matrices, each comprising complex-valued entries, evaluating, by the evaluation module, the plurality of detection matrices, including:

detecting road users on the at least one traffic route, using peaks of one or more of the detection matrices, determining, using the peaks that are assigned, respective ranges of the detected road users, determining a phase difference, for each pair of receiving antennae among a plurality of pairs of the receiving antenna, forming a plurality of phase differences, the phase difference being between complex-valued entries of the detection matrix corresponding to one of the two receiving antennae forming the pair and complex-valued entries of the detection matrix corresponding to the other of the two, and determining a dispersion of the plurality of phase differences;

generating, by the evaluation module, an evaluation signal that indicates ranges of the road users that are determined;

checking, by a diagnostic module of the electronic data processing device, whether a disturbance criterion is met, wherein the checking comprises determining the disturbance criterion is met when the dispersion exceeds a predetermined limit, and, when the disturbance criterion is met, generating a diagnostic signal; and transmitting the evaluation signal and the diagnostic signal to the traffic controller.

11. The method of claim 10, wherein the evaluating further includes:

detecting peaks of each of the detection matrices; and determining, for each of the detection matrices, peaks that can be assigned to moving objects and peaks that cannot be assigned to moving objects, and wherein determining the dispersion uses the peaks that can be assigned to moving objects and does not use the peaks that cannot be assigned to moving objects.

12. The method of claim 10, wherein determining the dispersion of the plurality of phase differences is configured to determine, as the dispersion, the standard deviation of the plurality of phase differences, and the method further comprises:
performing a plurality of the measurement cycles, producing a plurality of the standard deviations, wherein determining the dispersion uses the plurality of the standard deviations.

13. The method of claim 12, wherein the checking is configured to determine, as the dispersion, the average of the standard deviations.

14. A method for detecting road users along at least one traffic route, with diagnostics of disturbance, and for reporting the detecting and the diagnostics of disturbance to a traffic controller for at least one traffic route, comprising:
emitting transmission signals by a transmission device of a radar sensor, and detecting received signals by at least one reception device of the radar sensor, the radar sensor being maintained in a configured position and in a configured orientation near the at least one traffic route, by attachment to a pole, a sign, or a traffic light that is near the at least one traffic route, and the emitting being toward the at least one traffic route;
mixing the transmission signals and the received signals to produce baseband signals;
calculating a detection matrix using the baseband signals;
evaluating the detection matrix, in an evaluation module of an electronic data processing device, the evaluating including:
detecting road users on the at least one traffic route, using peaks of the detection matrix, and assigning a respective at least one of the peaks to the detected road users, and
determining, using the peaks that are assigned, respective ranges of the detected road users; and
generating, by the evaluation module, an evaluation signal that indicates the respective ranges of the road users that are detected;
determining, by the electronic data processing device, a characteristic of the received signals, the characteristic being indicative of signals within the received signals that are not reflections of the transmission signals;
checking, by a diagnostic module of the electronic data processing device, whether a disturbance criterion is met, the disturbance criterion being the characteristic exceeding a predetermined limit and, responsive to the disturbance criterion being met, generating a diagnostic signal; and
transmitting the evaluation signal and the diagnostic signal to the traffic controller.

15. The method of claim 14, wherein:
determining the characteristic includes determining, by the electronic data processing device, prior to calculating the detection matrix, a signal intensity in the baseband signal or a signal energy in the baseband signal; and
the disturbance criterion is based at least in part on the signal intensity or the signal energy in the baseband signal exceeding a limit.

16. The method of claim 15, wherein the limit is a variable limit, and the method further comprises:
determining or updating, by the electronic data processing device, an average or a mean of the baseband signal, and
updating the variable limit in accordance with the determined or updated average or mean of the baseband signal.

17. The method of claim 14, wherein:
calculating the detection matrix includes a multistage calculating of a Fourier transform, the multi-stage calculating including a first stage,
determining, by the electronic data processing device, a signal intensity from a result of the first stage of the multistage calculating, and
the disturbance criterion is met by the signal intensity exceeding the limit.

18. A method for detecting road users along at least one traffic route, with diagnostics of disturbance, and for reporting the detecting and the diagnostics of disturbance to a traffic controller for at least one traffic route, comprising:
emitting transmission signals by a transmission device of a radar sensor, and detecting received signals by at least one reception device of the radar sensor, the radar sensor being maintained in a configured position and in a configured orientation near the at least one traffic route, by attachment to a pole, a sign, or a traffic light that is near the at least one traffic route, and the emitting being toward the at least one traffic route;
measuring by a position sensor, as a measured position, the position of the radar sensor, or measuring by an orientation sensor, as a measured orientation, the orientation of the radar sensor, or both;
mixing the transmission signals and the received signals to produce baseband signals;
calculating a detection matrix from the baseband signals;
evaluating the detection matrix, in an evaluation module of an electronic data processing device, the evaluating including:
detecting road users on the at least one traffic route, using peaks of the detection matrix, and assigning a respective at least one of the peaks to the detected road users,
determining a number of the detected road users, using the peaks of the detection matrix to which at least one of the peaks is assigned, and
determining, using the peaks that are assigned, respective ranges of the detected road users;
generating, by the evaluation module, an evaluation signal that includes information indicating the respective ranges of the detected road users;
checking, by a diagnostic module of the electronic data processing device, whether a disturbance criterion is met, the disturbance criterion being the measured position of the radar sensor deviating from the configured position by more than a predetermined position limit, or the measured orientation of the radar sensor deviating from the configured orientation by more than a predetermined orientation limit, or both, and in response to the disturbance criterion being met generating a diagnostic signal indicating the disturbance criterion being met; and
transmitting the evaluation signal and the diagnostic signal to the traffic controller.

19. The method of claim 18, further comprising:
measuring by an acceleration sensor, in at least two independent spatial directions among three independent spatial directions, an acceleration of the radar sensor, as a measured acceleration, or measuring by a velocity sensor, in the least two independent spatial directions, a velocity of the radar sensor, as a measured velocity, or both, wherein:
the checking also includes determining the disturbance criterion is met when the measured acceleration exceeds a predetermined acceleration limit, or the measured velocity exceeds a predetermined velocity limit, or both.

20. The method of claim 18, wherein:
the position sensor is an on-board sensor included in the radar sensor, or the orientation sensor is an on-board sensor included in the radar sensor, or both.

\* \* \* \* \*